(12) United States Patent
Toth (10) Patent No.: US 9,772,452 B1
(45) Date of Patent: Sep. 26, 2017

(54) HYBRID CONNECTION SYSTEM HAVING SEPARATELY SEALED PLUG AND RECEPTACLE CHAMBERS

(71) Applicant: John Robert Toth, Winter Garden, FL (US)

(72) Inventor: John Robert Toth, Winter Garden, FL (US)

(*) Notice: Subject to any disclaimer, the term of this patent is extended or adjusted under 35 U.S.C. 154(b) by 0 days.

(21) Appl. No.: 15/418,243

(22) Filed: Jan. 27, 2017

(51) Int. Cl.
G02B 6/38 (2006.01)
H01R 13/52 (2006.01)
H01R 13/629 (2006.01)

(52) U.S. Cl.
CPC ......... G02B 6/3817 (2013.01); G02B 6/3849 (2013.01); G02B 6/3893 (2013.01); H01R 13/521 (2013.01); H01R 13/5219 (2013.01); H01R 13/62905 (2013.01)

(58) Field of Classification Search
CPC ...... G02B 6/38; G02B 6/3817; G02B 6/3849; G02B 6/3893; H01R 13/52; H01R 13/521; H01R 13/5219; H01R 13/629; H01R 13/62905
See application file for complete search history.

(56) References Cited

U.S. PATENT DOCUMENTS

| | | | | |
|---|---|---|---|---|
| 4,799,512 A * | 1/1989 | Sarson | ............... | F16L 37/22 137/614.04 |
| 5,645,438 A * | 7/1997 | Cairns | ............... | G02B 6/3816 439/139 |
| 5,722,842 A * | 3/1998 | Cairns | ............... | G02B 6/3816 439/139 |
| 8,226,303 B2 * | 7/2012 | Toth | ............... | G02B 6/3816 385/53 |
| 9,651,742 B2 * | 5/2017 | Toth | ............... | G02B 6/3816 |
| 9,690,052 B2 * | 6/2017 | Toth | ............... | G02B 6/3816 |
| 2006/0263011 A1 * | 11/2006 | Chen | ............... | G02B 6/3817 385/75 |
| 2011/0129187 A1 * | 6/2011 | Toth | ............... | G02B 6/3816 385/70 |
| 2011/0188810 A1 * | 8/2011 | Ciechomski | ......... | G02B 6/4416 385/62 |
| 2012/0039571 A1 * | 2/2012 | Ciechomski | ......... | G02B 6/4475 385/78 |
| 2013/0094810 A1 * | 4/2013 | Toth | ............... | G02B 6/3816 385/70 |
| 2014/0270645 A1 * | 9/2014 | Toth | ............... | G02B 6/3849 385/58 |
| 2014/0270679 A1 * | 9/2014 | Scea | ............... | G02B 6/3849 385/139 |

(Continued)

Primary Examiner — Andrew Jordan
(74) Attorney, Agent, or Firm — Greenberg Traurig, LLP (57) ABSTRACT

A connector mating system that can enable the coupling and decoupling of electrical or optical power and communications channels, while in a harsh or submerged environment during which time the contacting interfaces of the power and communication channels remain fully protected from the destructive effects of the said environment. The system features a hybrid optic and/or electric connector that provides a means for electrical, optical and hybrid inter connection within an extremely hostile environment across a broad market range of applications with a novel end-seal concept in a scalable form factor with minimal actuation stresses and designed for high volume commodity manufacturing.

35 Claims, 11 Drawing Sheets

(56) References Cited

U.S. PATENT DOCUMENTS

| | | | |
|---|---|---|---|
| 2015/0280356 A1* | 10/2015 | Jove Albos | H01R 13/504 439/587 |
| 2016/0070072 A1* | 3/2016 | Penumatcha | G02B 6/3817 385/59 |
| 2016/0274309 A1* | 9/2016 | Toth | G02B 6/3816 |

* cited by examiner

HYBRID CONNECTION SYSTEM HAVING SEPARATELY SEALED PLUG AND RECEPTACLE CHAMBERS

This application includes material which is subject to copyright protection. The copyright owner has no objection to the facsimile reproduction by anyone of the patent disclosure, as it appears in the Patent and Trademark office files or records, but otherwise reserves all copyright rights whatsoever.

FIELD OF THE INVENTION

The present invention relates to systems and methods for electrical or optical connectors, and more specifically, to electrical or optical connectors for connections in harsh or submerged environments.

SUMMARY OF THE INVENTION

A connector contact mating mechanism that can enable the coupling and decoupling of optical and/or electrical power or communication, command & control, and/or data acquisition channels while immersed in or surrounded by a contaminating environment, during which time the channel contacting interfaces remain fully protected from the destructive effects of the said environment. This disclosure describes a hybrid optic electric connection device that uses a novel low tolerance, low stress, elastomer end-face valve concept designed for high volume commodity type manufacturing, in a scalable arrangement, supporting a broad range of submersible or harsh environment interconnect applications.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 2a-2d illustrates a series of descriptive drawings of the principle internal mechanisms of one embodiment of the connector set proper, in which:

DETAILED DESCRIPTION

Hybrid Connection System Engagement Description

As a global advancement in the art of electrical and/or optical connector design, the principle intent of this invention is to provide a means by which the electrical and/or optical contact interfaces of such contacts are, at all times, sealed from communication with the surrounding environmental conditions before, during, and after the mating, and throughout the dis-mating process.

The basic operating concept for one embodiment of the connector system is illustrated in FIG. 1-5, and is described in four sequential drawings in FIG. 2. In the first drawing, FIG. 2A, an end-face valve represents the receptacle elastomer end-seal interface component 1 and the plug elastomer end-seal interface component 2. The two end-face valve representations are shown separated, as in a position poised to mate. The receptacle end-face valve 1, in this representation, is positively seated into the interface end of the receptacle assembly. In like manner, the plug end-face valve 2, in this representation, is positively seated into the interface end of the Plug assembly. Where passages through each end-face valve are always aligned with a corresponding electrical and/or optical contacts, and are closed and sealed with the end-face valves in a flat face sealed profile attitude.

Figure 1:
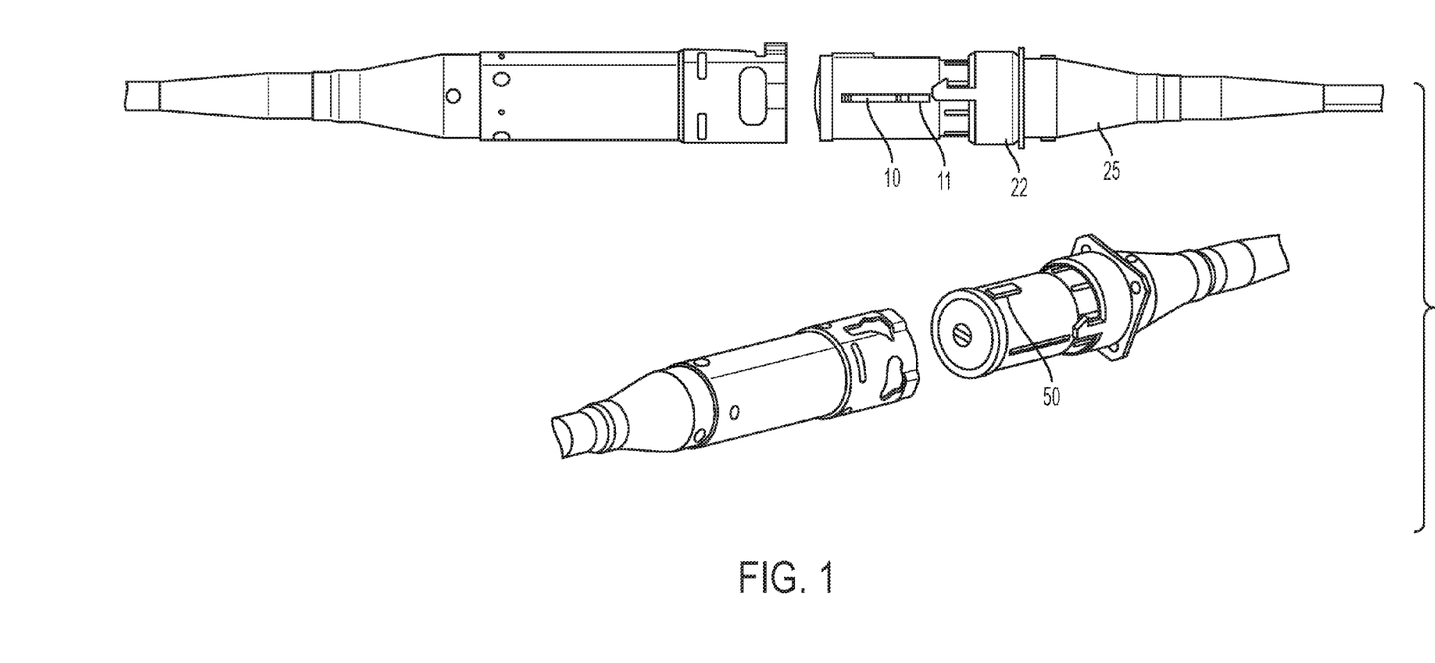
FIG. 1 illustrates a series of external profile views of one embodiment of a connector set in which the receptacle assembly and related plug assembly are independently represented in a configuration that supports bulkhead mounting of the plug and cable-end engagement of the receptacle, or cable-end to cable-end connection of the plug and receptacle either by hand intervention or by use of a fixture.
Figure 2A:
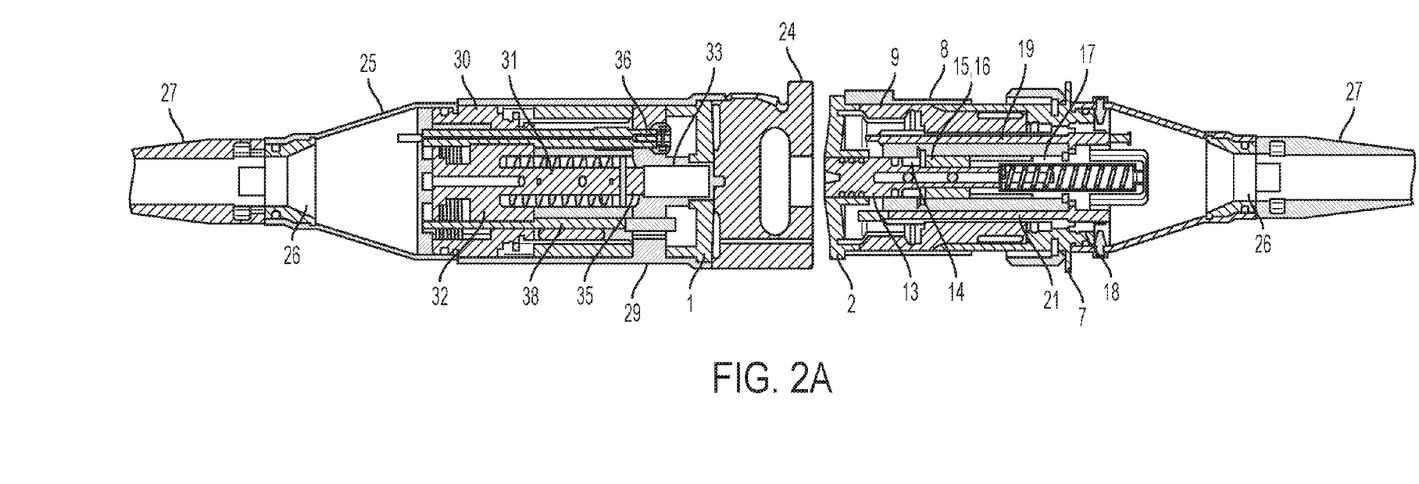
FIG. 2a illustrates a longitudinal section view of one embodiment of the complete disengaged receptacle and plug system, including numerical identifications of the various components and features of the internal mechanisms.
Figure 2B:
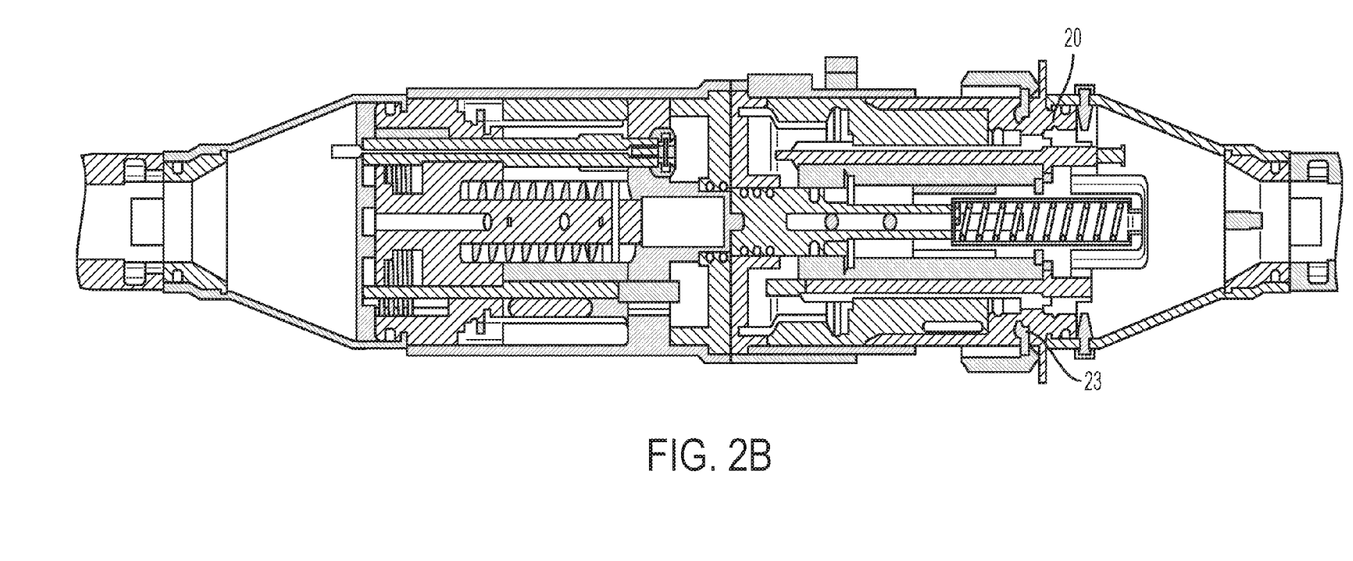
FIG. 2b illustrates a longitudinal section view of one embodiment of the receptacle and plug, which describes the alignment and orientation of the receptacle and plug at initial contact between the receptacle and plug end-face valves.

A mating force, applied to both the Receptacle and Plug assemblies, next brings the two sealed end-face valve face profiles together, as represented in FIG. 2B. The joining of the two end-face valves automatically locks these components together in such manner that their displacements and through-passages remain perfectly aligned throughout the entire mating, mated and dis-mating process. At the same time, the interfacing rims of the receptacle interface shell 29 and the flanged plug shell 7-slide shell 8 assembly are joined allowing the end-face valves 1 and 2 to form a fluid-tight face-to-face seal so as to prevent the surrounding environment from entering between the faces and migrating into the receptacle and plug assemblies. To this point, each of the sealed receptacle end-face valve passages is aligned with the corresponding plug end-face valve passages and remains located directly in the path of the electrical and/or optical contacts. As the compressive force between the receptacle and plug is then increased, FIG. 2C, the joined end-face valves are made to centrally displace and shape, together coincidentally, where the receptacle end-face valve takes on a centrally depressed profile and conversely the plug end-face valve takes on a centrally extended profile, while remaining in a face-sealed and locked contact position throughout the process.

Figure 2C:
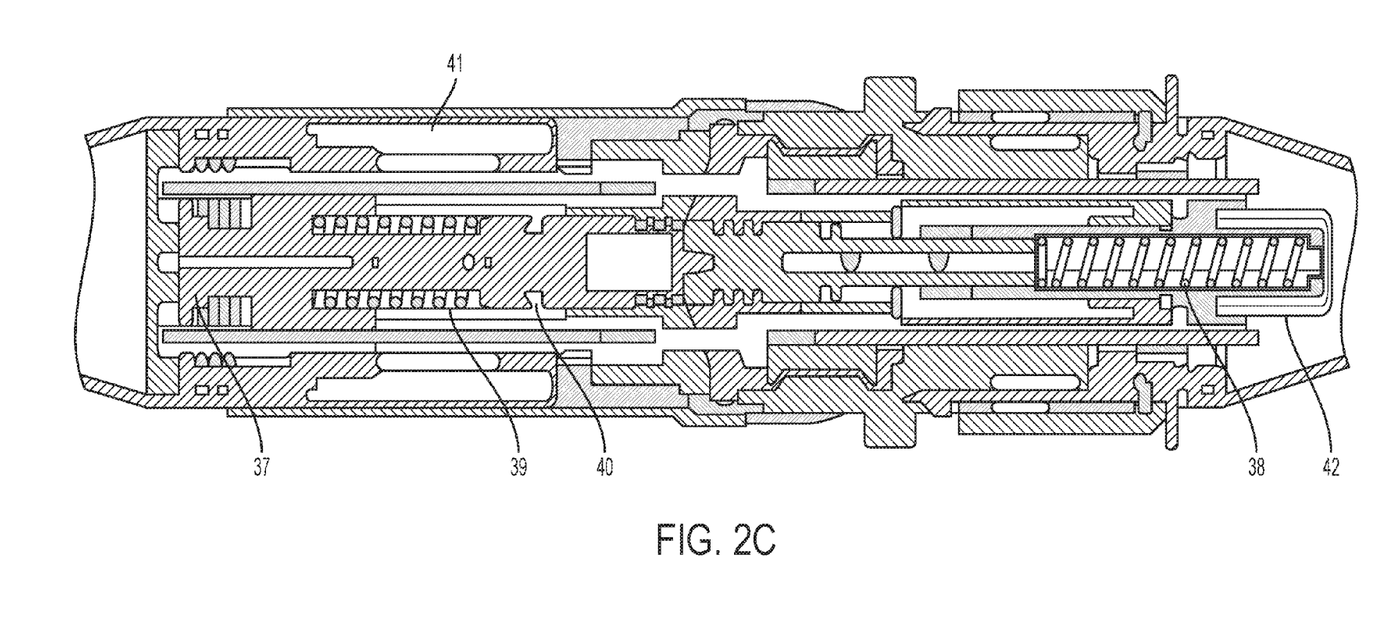
FIG. 2c illustrates a longitudinal section view of one embodiment of the receptacle and plug, which describes the behavior of the various internal components at partial engagement.

During the end-face valve displacement and shaping, the shaft of the receptacle interface shaft component 33, is radially cammed to follow the natural torsional twisting motion of the end-face valve center that occurs during the end-face valve shaping, FIG. 2c, while moving between the flat and centrally extended or centrally depressed profiles. The interlocked condition of the two elastomer end-face valves (receptacle and plug) assures that both of these components are made to shape and twist together, in perfect coincidence. The consequent effect of this twisting and shaping is to fully open the seal passages, while minimizing any residual stresses into the elastomer end-face valves, and to thereby establish a long-term travel path, sealed from the effects of the external environment, for the plug contacts to traverse through. As the compression of the receptacle and plug assemblies continues beyond the fixed travel limits of the elastomer end-face valves 1, 2, into a full-mated condition, FIG. 2d, the plug contacts travel through the end-face valve passages and fully engage the receptacle contacts in the sealed isolated environment. Upon complete mating of the receptacle and plug assemblies, the coupling mechanism is enabled to fully engage, securing the receptacle and plug assemblies together until separation is achieved by rotationally unlocking of the coupling Actuation Ring 22.

Elastomer End-Face Valve Description

As a specific advancement in the art of electrical and/or optical connector end-face seal design, the functionality of the elastomer end-face valve is described.

Figure 3A:
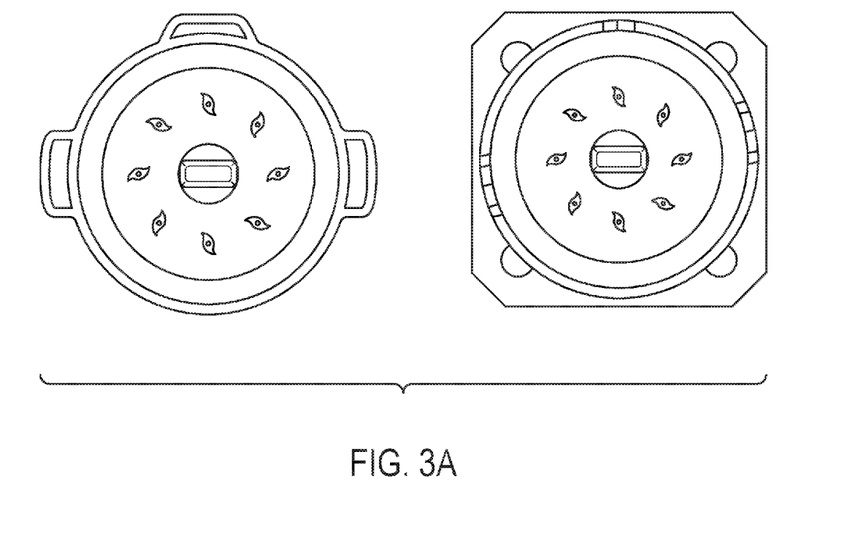
FIG. 3a illustrates one embodiment of a direct end view of the example receptacle and example plug interface end-face valve with passageways shown partially open.
Figure 3B:
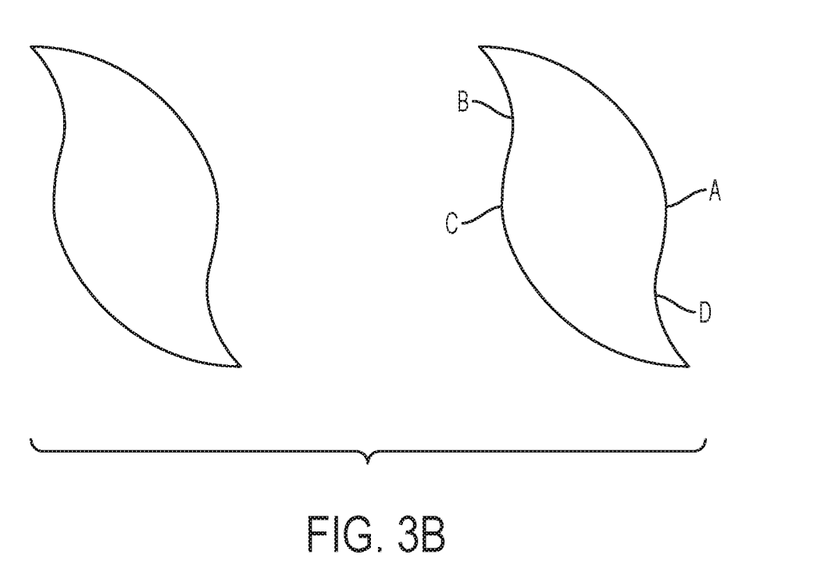
FIG. 3b illustrates one example of the end-face valve open passageway geometry and matched sealing surfaces.
Figure 4A:
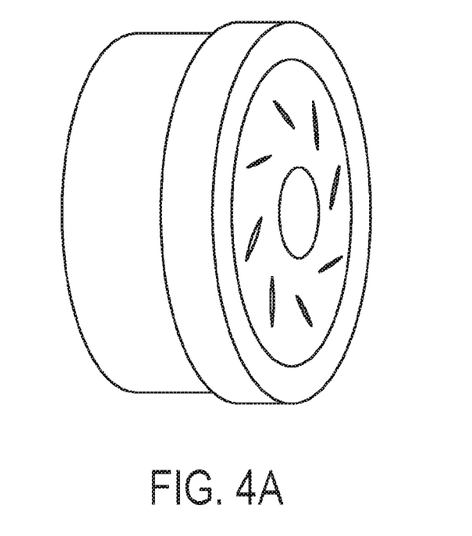
FIGS. 4a-4c illustrate one embodiment of a representation of a elastomer end-face valve element in various planer and shaped orientations which functions to isolate the contact chamber of the receptacle or plug assemblies, but which has passages that close and seal, and re-open without imparting residual stress into the elastomer and allowing passage by either electric or optic contacts through the sealed passages.
Figure 4B:
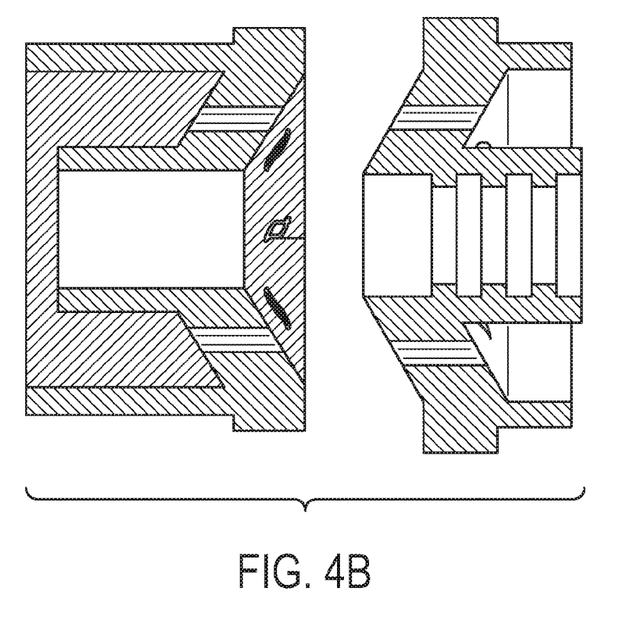

The basic operating concept for the elastomer end-face valve, as shown in FIG. 4a in a flat collapsed profile, and in 4b with a centrally extended and centrally depressed quiescent attitudes is described, where the flat profile in FIG. 4a shows a series of closed radially positioned through-passages, where each passage has a volute orientation and angle about a central bore on the end-face valve face. FIG. 3a also shows the same through passages in a partially opened through-passage shape with mirrored tails resembling a hurricane symbol shape, such as shown in FIG. 3b, positioned radially about the valve center forming a volute orientation.

Understanding the novel elastomer end-face valve design requires knowledge that the flat profiled end-face valve volume is equal to the centrally depressed or extended end-face valve volume, where the through-passage size, depression or extension geometry, and end-face valve diameter are such that a balanced volume is achieved where the centrally extended or centrally depressed conically shaped profile material volume, with through-passages open, occupies the same material volume as the flat profile with the through-passages closed; where a centrally extended or depressed end-face valve can be pressed into a flat orientation such that the open passages will have a natural unforced tendency to close during the transition from the centrally extended or depressed profile to the flat profile. This volume matching constrains the through-passage size to the end-face valve size such that an incrementally larger scaled end-face valve will have incrementally larger through passages and conversely an incrementally smaller scaled end-face valve will have incrementally smaller through-passages.

Additional understanding of the novel end-face valve concept is associated with the intentional volute profiling of the radially oriented through-passages, where the volute profile, combined with the through-passage shape, imparts a natural twisting of the centrally extended and centrally depressed shapes, which prevents bunching and distortion of the elastomer, as the end-face valve is moved from a centrally extended or centrally depressed profile into a flat profile shape. It should be noted that the elastomer end-face valve functions identically moving from either a centrally depressed shape to a flat profile, or by moving from a centrally extended shape to a flat profile allowing the end-face valve to be used in applications favorable to a depressed or favorable to an extended orientation in both single seal applications or dual face-to-face applications as described herein.

Furtherance of the novel end-face valve concept description involves understanding the function of the radially positioned and volute oriented through-passage profile, described in FIG. 3b as a hurricane symbol shape. Where the shape shown combined with the volute orientation has a natural tendency to close without deformation as the end-face valve moves from a centrally extended or centrally depressed position to a flat profile, with curve arc profile B of the through-passage, marked in FIG. 3b slightly elongating and matching to curve arc profile A, and curve arc profile D slightly elongating and matching to curve arc C, and with face to face matching of the remaining tail profiles, resulting in an overall closed and sealed passage profile while minimizing any residual stresses imparted into the end-face valve.

Figure 4C:
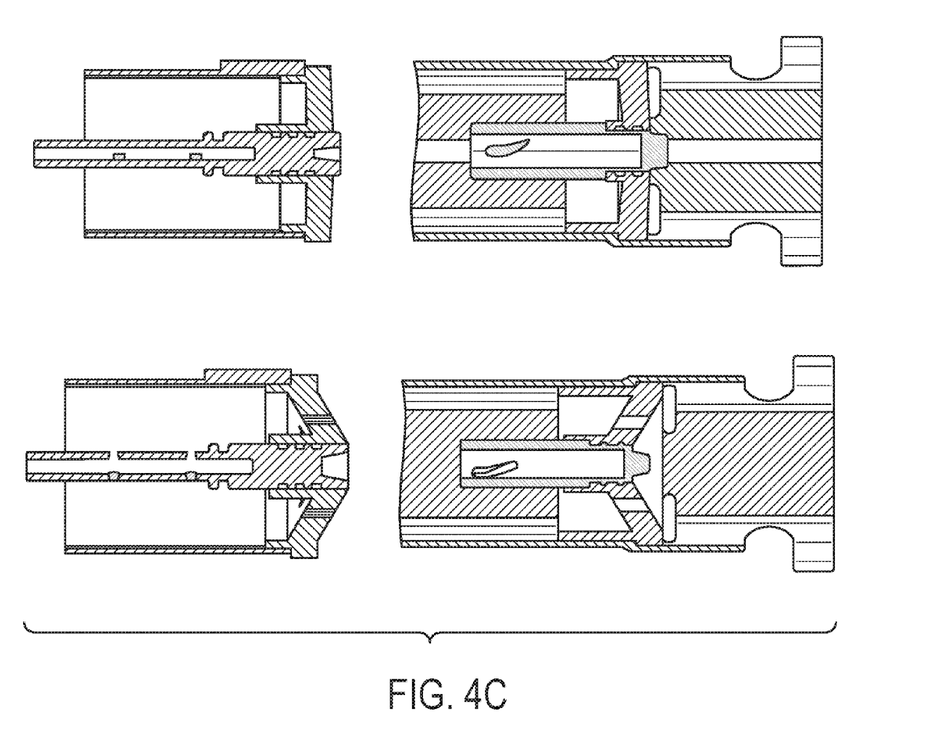
Figure 5:
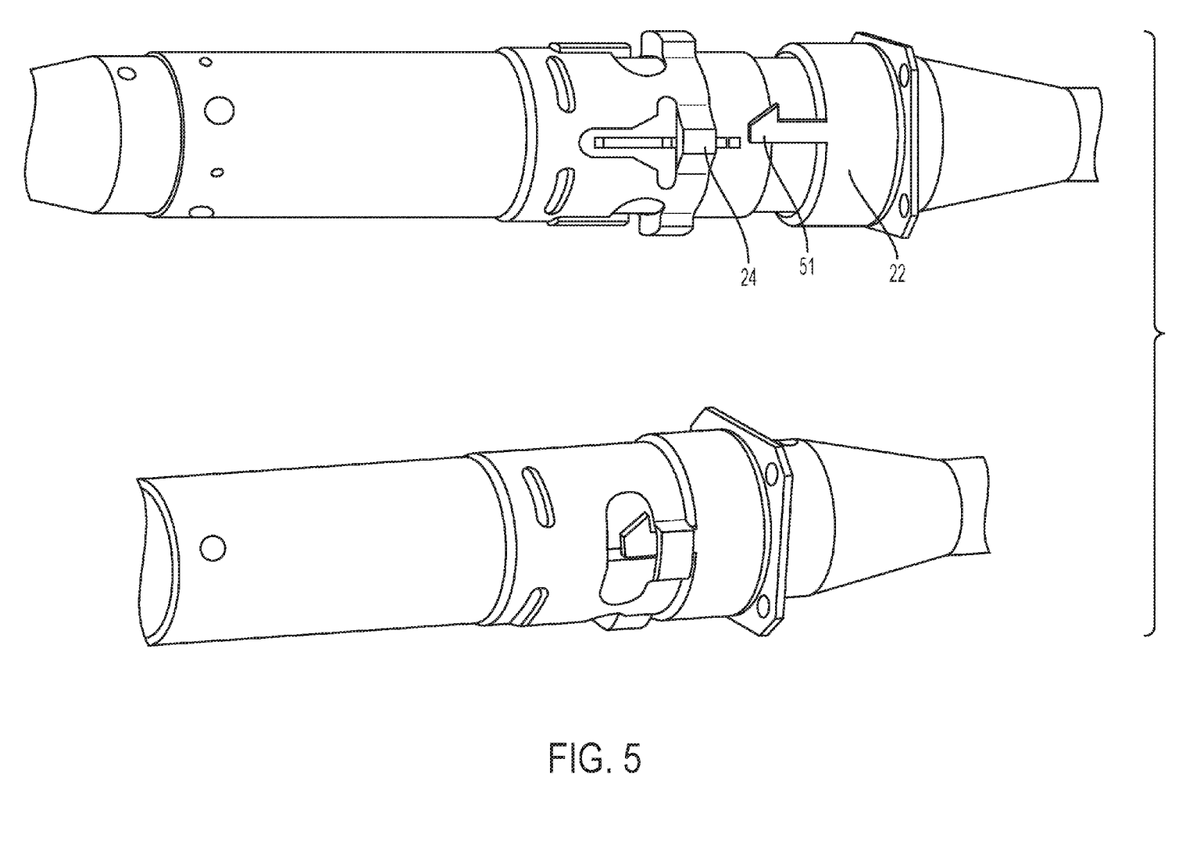
FIG. 5 illustrates one embodiment of the coupling ring latching mechanism as it appears in both its engaged and disengaged attitudes.

FIG. 4c shows a shaft representation added to the central through-passage of the end-face valve which can be used as an actuation device. Where the shaft can be made from metallic or plastic material, and either attached with an adhesive or molded in place with the end-face valve elastomer. With reference to the figure and with the outer rim of the end-face valve fixedly attached to a representative connector shell using either an adhesive, molding, or by way of mechanical retention in a manner consistent with the method the end-face valve would be installed as a connector end-seal assembly such that: an extension force applied to the shaft of a closed-through-passage flat profile collapsed end-face valve shape, with the valve rim fixed, causes the end-face valve to extend to an open-through-passage centrally extended quiescent profile. Where the action of going from a flat profile shape to a centrally extended shape imparts a natural torque/twist of on the end-face valve (with a resultant twisting of the central shaft), opens the through-passages, and maintains constant volume between the flat profile shape with through-passages closed to the centrally extended profile with through passages open. Similarly in an alternate configuration starting with the end-seal valve in a flat closed through-passage collapsed profile, with an axially fixed shell interface, and rotationally and axially compliant central shaft; and with a retraction force applied to the shaft, results in an end-face valve shaping where the end-face valve profile goes from a closed-through-passage flat position to an open through-passage centrally extended quiescent position.

In summary the natural balancing of the end-face valve shaped volumes, the through-passage shape, the volute orientation of the passages, and the natural twisting during shape change, all combine and result in a scalable elastomer end-face valve design that easily moves back and forth between open and closed passage positions without any significant stress on the elastomer, eliminating compressionset, tearing, over stretching, sticking, and other issues potentially affecting the performance and life cycle of the end-face valve, where;

By placing the two flat profile collapsed end-face valves with closed through-passages in a face-to-face orientation, followed by a central depressing action on one end-face valve and a coincident central extension action on the opposing end-face valve, with both seal rims fixed, results in a novel end-face elastomer valve that:

1. Provides a low stress state sealing interface for an unmated connector half.
2. Provides a low stress state sealing interface between the mated connector halves.
3. Provides a low stress state aligned passages through each end-face valve for the optical and/or electrical contacts to pass through and make contact engagement with the opposing connector halves.

The above description teaches the concept of the low stress elastomer end-face valve where it is noted that additional profiling operations such as adding volute ribs or depressions to the back face of the valve, removal of or addition of material to the end-face valve to further balance the material volume between extended and flat shapes, or other modification to the profiles that enhance closure and stress relief are not shown but can be applied to further refine and enhance the end-face valve operation.

Plug Assembly Description

With reference to FIG. 1-5, and more specifically to the longitudinal section view of the plug assembly of FIG. 2A, in one embodiment, the structure is composed of a flanged plug shell 7 which attaches to a slide shell 8 and an insert shell 9, which insert shell is installed in fixed orientation to the plug alignment guide slot 10. This orientation is achieved by securing of the slide shell 8 with the flanged plug shell 7, by means of a snap feature 11, and the alignment and attachment of the slide shell 8, and insert shell 9 with end-face valve 2.

The flanged plug shell 7 and the slide shell 8 are also keyed to prevent rotation by means of a snap feature 11 in guide slot 10, which assembly also serves to fixedly secure all of the internal components of the plug assembly. Within the core of the insert shell 9, and in fixed orientation, is secured the interface shaft 13 by fixed attachment of the interface shaft to the end-face valve 2. This shaft 13 is configured with a camming shoulder 14, which is functionally engaged to a corresponding seat 15 and camming slot 16, which slot in turn are features of the plug guide shaft 17 which is secured to the flanged plug shell 7 by a snap feature 18.

Mounted within the flanged plug shell 7 is at least one electric contact 19, which is secured, keyed, and sealed into the flanged plug shell 7 by means of a quad seal 20 and the fixed guide shaft 17, and/or mounted within the flanged plug shell 7 is at least one optical contact 21, which is secured, keyed, and sealed into the flanged plug shell 7 by means of a quad seals 20 and the fixed guide shaft 17. A multiplicity of such contacts, or alternate contacts containing elements of both optic and electric contacts, can be coincidentally arrayed within the assembly, in any combination.

Figure 3C:
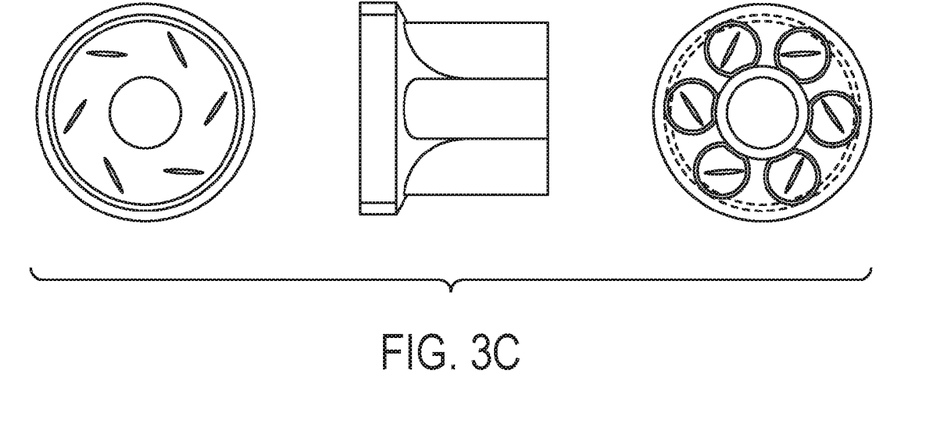
FIG. 3c illustrates a single contact chamber where an alternate configuration providing additional isolation between the adjacent contacts utilizes an individual isolated contact chamber for each contact.

When the plug assembly is in the dis-mated condition, the end-face valve 2 serves to isolate the internal electrical and/or optical contacts from the external environment by way of closed through-passages which fully seal closed from an axial central displacement on the end-face valve 2 by the guide shaft 17 and resultant natural twisting of the end-face valve and fixed sealing to the insert shell 9 and slide shell 8; where the sealed insert shell may then be filled with a dielectric fluid to further isolate the contacts and to pressure compensate the insert shell. During the mating process, the forward end of the end-face valve 2 is so configured to move from a flat closed profile by re shaping the seal to the centrally extended open state, as to permit passage by either type of receptacle contact, whether an electric contact 19 or an optic contact 21. In the embodiment described a single contact chamber is shown, within insert shell 9, where an alternate configuration providing additional isolation between the adjacent contacts utilizes an individual isolated contact chamber for each contact with an end-face valve with extension leg features originating from the back face of the of the end-face valve and connecting with the individual contact chambers as shown in FIG. 3C.

Latching features associated with the plug are also shown in the figure which provide longitudinal section views of one embodiment of a coupling ring mechanism, and identify all of the significant components of the system, and their positioning in relationship to each other. The flanged plug shell 7 comprises the foundation of the mechanism, onto the end of which is mounted the principle engagement element, the coupling ring 22. The coupling ring 22, in turn, is secured to the plug assembly by means of a retaining ring 23, which seats and locates in a detent so as to protrude into a groove feature of the coupling ring. A passage feature in the detent is configured to anchor the retaining ring and permit a limited rotational travel motion of the coupling ring 22 with a spring-back reverse return.

The coupling ring 22 has wedge fingers features 51 that contact corresponding receiving shoulder features 24 on the receptacle shell causing the ring to rotate until continued engagement of the plug to the receptacle causes the wedge feature to reach a clearance area on the wedge finger allowing the retaining ring to rotate the coupling ring back to the starting position and latch the connector halves together.

Finally, attached to the rear face of the plug flange shell is the cable termination shell 25. The cable termination shell is the foundation of the cable termination anchor wedge penetration socket 26 and strain relief boot 27. The termination housing serves as a load caring member attaching the cable to the flanged plug shell using the anchor wedge penetration, where the wedge penetration anchors the cable reinforcement in the conical wedge feature and seals and allows passage of the optical fiber or electric conductor from the cable to the pin array.

Receptacle Assembly

With reference to FIG. 2a, and more specifically to the longitudinal section view of the receptacle assembly, in one embodiment, the structure is composed of a receptacle shell 29 which attaches to a pin base 30 and a guide shaft 31, where the base and guide shaft are installed in fixed orientation to the receptacle shell alignment key. This orientation is achieved and secured by the alignment of the pin base 30 with the receptacle shell 29, by means of a keyed snap feature 32 and threaded radial fasteners. Within the core of the receptacle shell 29, and in fixed orientation, is the interface shaft 33 which is keyed to the guide shaft 31 by a camming pin 35 and by fixed attachment of the interface shaft to the elastomer end-face valve 1.

Mounted within the base 30 is at least one electric contact 36, which is secured and keyed in the base shell 30 by means of a backing plate 37 and/or mounted within the base 30 is at least one optical contact 38, which is secured and keyed in the base shell 30 by means of a backing plate 37. A multiplicity of such contacts, or alternate contacts containing elements of both optic and electric contacts, can be coincidentally arrayed within this assembly, in any combination. When the receptacle assembly is in the dis-mated condition, the end-face valve 1 serves to isolate the internal electrical and/or optical contacts from the external environment by way of closed through-passages which fully seal closed from an axial central displacement on the end-face valve by the guide shaft 33, and the resultant natural twisting of the end-face valve, and fixed sealing of the end-face valve 1 to the receptacle shell, Where the sealed receptacle shell may then be filled with a dielectric fluid to further isolate the contacts, and to pressure compensate the receptacle shell. During the mating process, the forward end of the end-face valve is so configured to move from a flat closed profile by re shaping the valve to the centrally depressed open state, as to permit passage by either type of receptacle contact, whether an electric contact 36 or an optic contact 38. In the embodiment described a single contact chamber is shown where an alternate configuration providing additional isolation between the adjacent contacts utilizes an individual isolated contact chamber for each contact with an end-face valve with extension leg features originating from the back face of the of the end-face valve and connecting with the individual contact chambers as shown in FIG. 3C.

Attached to the rear shoulder of the pin base 30 is the cable termination shell 25 (FIG. 2). The cable termination shell is the foundation of the cable termination anchor wedge penetration socket 26 and strain relief boot 27. The termination housing serves as a load caring member attaching the cable to the pin base using the anchor wedge penetration, where the wedge penetration anchors the cable reinforcement in the conical wedge feature and seals and allows passage of the optical fiber or electric conductor from the cable to the pin array.

Receptacle and Plug Mating Sequence

FIG. 2 provides a series of longitudinal section views of one embodiment of both the receptacle and plug assemblies, which views describe the sequential behavior of the internal mechanisms of this connector system and contacts during the entire engagement process, where FIG. 2A describes a fully dis-mated connector set, showing the condition of all internal components prior to engagement. FIG. 2B illustrates the initial interface contact of the receptacle and plug assemblies, and describes the manner in which the keyed shell feature 50 of the flanged plug shell is captured and aligns with the key slot feature of the corresponding receptacle shell providing an initial gross alignment/clocking feature between the flanged plug shell 7 and the receptacle shell 29. Fine alignment is then achieved where a raised key feature on the receptacle interface shaft end 33, engages into corresponding recessed features of the plug interface shaft end 13, which features are made to be completely identical in position and contour. These interface features provide a means by which receptacle end-face valve 1 and the plug end-face valve 2 are securely fixed together so that their orientation, relative to each other will be held coincident throughout the connector set mating process. This section view further demonstrates that upon initial contact, the end-face valve of the plug 2, which is the forward-most structural component of the plug, and the elastomer end-face valve 1 of the receptacle assembly, are in direct face-to-face contact, and will remain so throughout the mating process.

Figure 2D:
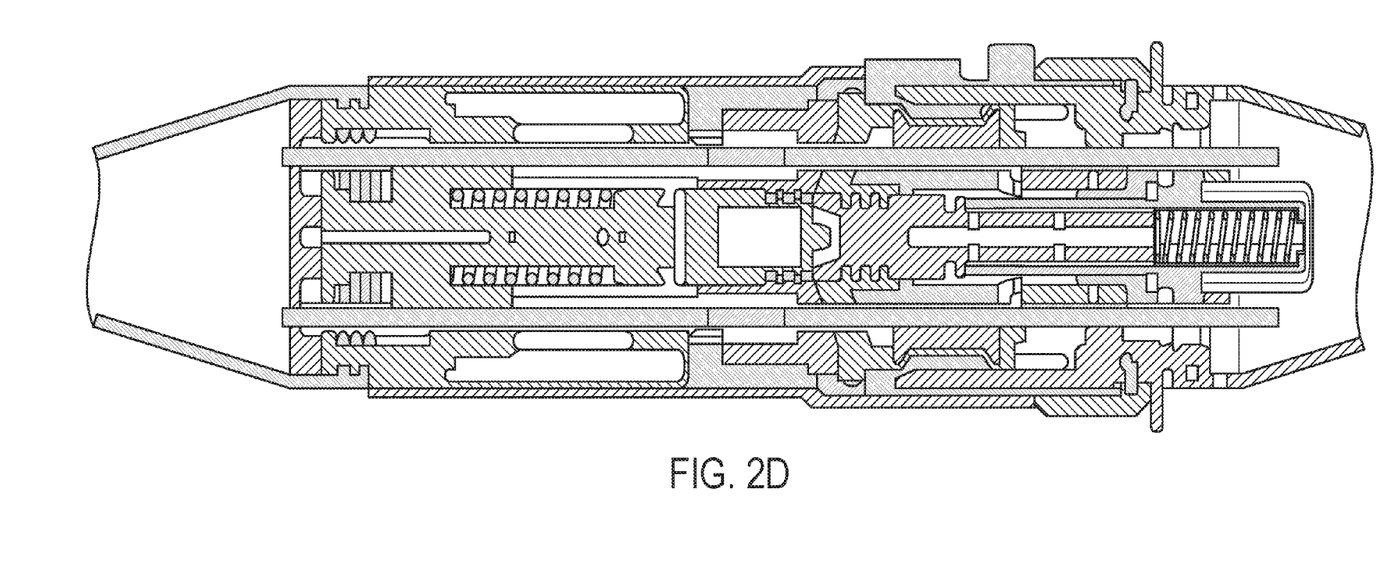
FIG. 2d illustrates a longitudinal section view of one embodiment of the receptacle and plug, which describes the behavior of the various internal components at full engagement.

FIG. 2C describes the effects of the initial compressive force as it is applied to the engagement of the receptacle and plug assemblies. Upon application of this force, the travel of the plug slide shell 8, over the plug flange shell 7, immediately applies a corresponding central extension force to plug end-face valve 2 which is fixed in attitude relative to the slide shell 8 and begins to take on a centrally extended shape. Similarly, within the receptacle assembly the centrally extended shaping of the plug elastomer end-face valve is inversely mirrored by the centrally depressed shaping of the receptacle end-face valve. This shaping of the end-face valves occurs where the plug end-face valve is fixedly attached to an interface shaft 13 with camming shoulder 14 that reacts and is prevented from displacing axially by corresponding interface guide shaft 17 shoulder. As the receptacle and plug end-face valves 1, & 2 displace axially into their centrally extended and centrally depressed quiescent shapes a natural twist motion is developed when the receptacle end-face valve displaces and in turn tracks with plug camming peg 35 of the interface shaft 31 within barrel cam track of the receptacle guide shaft 33 in such a way that the natural twisting of the end-face valve during shaping is coincident with the camming peg motion in the cam track. The central displacing and twisting motion of the receptacle end-face valve and identical central displacing and twisting motion of the plug end-face valve, coincident through the keyed interface between the face to face end-face valves opens the passage ways on both seals allowing free sealed communication between the partially engaged connector halves. As the engagement process continues the plug interface shaft camming shoulder 14 rotates off of the corresponding guide shaft 17 shoulder aligning with the guide shaft longitudinal slot and supported by the guide shaft spring 38 preload. Once aligned with the plug guide shaft slot the plug pin array is then free to translated towards the receptacle pin array passing through the now open passages in the end-face valves, where, as shown in FIG. 2d, continued engagement allows the pin array contacts to engage.

As the pin arrays contact, the coupling ring 22 wedge fingers 51 concurrently contact the corresponding receiving shoulder features on the receptacle shell 29 causing the ring to rotate until continued engagement of the plug to the receptacle causes the wedge feature to reach a clearance area on the wedge finger allowing the retaining ring to rotate the coupling ring and fixedly latch the connector halves together.

Later, as the connector set separation is made to occur, the action of the plug interface spring 38 causes a repositioning and initial disengagement of the of the plug contact array. Further separation of the surrounding connector set causes retraction of all of the core components of the plug contacts coincident with repositioning of the plug slide shell, and reshaping of the end-face valves. As the final separation occurs the elastomer end-face valves are move to the through-passage closed position under the influence of expanding receptacle guide shaft spring 39 against the receptacle interface shaft 17 with barrel cam which tracks and prevents any sticking during the reshaping the end-face valves from the centrally extended and centrally depressed profiles to their initial flat individually sealed profile within their respective receptacle and plug shells.

It is noted that FIG. 2 of the receptacle and plug each show various forms of shell-to-shell O-ring seals along with compensation bladders 41 and piston volume compensators 42. These various seals and volume compensation components allow the Hybrid Connection System to operate in a fully submerged high pressure environment and provide temperature compensation for expansion and contraction of an internal dielectric fluids across the temperature ranges experience during operation and storage. As an alternate embodiment the Hybrid Connection System functions to fully isolate and protect the optical and electrical contact interfaces in an air filled arrangement suitable for atmospheric harsh environment engagement and disengagement of the connector halves.

While various embodiments have been described for purposes of this disclosure, such embodiments should not be deemed to limit the teaching of this disclosure to those embodiments. Various changes and modifications may be made to the elements described above to obtain a result that remains within the scope of the systems and methods described in this disclosure.

The invention claimed is:

1. A connector set comprising:
a receptacle having a single or multiple contact chambers with electrical or optical contacts and a plug having a single or multiple contact chambers with electrical or optical contacts, the receptacle being adapted to receive the plug; the contact chambers in the receptacle and the contact chambers of the plug each being sealed by an end-face valve that provides sealed isolation of the electrical and/or optical contacts prior to engagement of the receptacle and plug while concurrently providing sealed contact between the receptacle and plug during and after engagement of the plug and receptacle, and a sealed passageway or passageways between the receptacle and plug for the electrical or optical contacts to make connection between the sealed plug and receptacle; the receptacle and plug elastomer end-face valves being shaped in a manner such that they independently or coincidently move from a closed through-passage position to an open through-passage position while remaining in a balanced material volume state, where material volume of the valve profile with through-passages open is matched to material volume profile of the valve with the through-passages closed, and where through-passage orientation and shape are such that by moving the valve from a through-passage open to a through-passage closed state develops a natural twist motion of the valve so as to minimize elastomer stress associated with opening and closing the through-passages; and, the end-face valve matched volumes, the through-passage shape, and the through-passage orientation being mutually dependent relationships that fully define the valve operation such that the valve is scalable between large diameter, large through-passage and small diameter, small through-passage embodiments without affecting operation.

2. The connector set of claim 1 wherein the end-face valve provides a sealed environmental isolation end-seal barrier on the plug and on the receptacle prior to engagement of the plug and receptacle.

3. The connector set of claim 1 wherein an end-face valve is installed in a receptacle shell and in a plug shell, providing a sealing interface between the respective receptacle and plug shell and the end-face valve prior to, during, and following engagement of the receptacle and plug.

4. The connector set of claim 1 wherein the end-face valve forms a contact chamber within the receptacle and the plug and form an isolated and sealed passageway between the contact chamber of the receptacle and the plug.

5. The connector set of claim 1 wherein the isolated contact chambers in the receptacle and the plug, are contiguous following engagement of the receptacle and plug.

6. The connector set of claim 1 wherein connector contact chambers in the receptacle and the plug, are barrier isolated prior to engagement and following disengagement of the receptacle and the plug.

7. The connector set of claim 1 where the end-face valve provides sealed barrier isolation of the contact chamber in the receptacle.

8. The connector set of claim 1 where the end-face valve provides sealed barrier isolation of the contact chamber in the plug.

9. The connector set of claim 1 where the end-face valve of the plug and of the receptacle provide a face-to-face sealing during and following engagement of the plug and receptacle.

10. The connector set of claim 9 where the end-face valve of the plug forms a face-to-face seal with the end-face valve of the receptacle such that the passages through the valves are aligned.

11. The connector set of claim 10 where the end-face valves in a face-to-face sealing orientation, centrally extend, centrally depress, and naturally twist, coincidently while moving from the centrally flat closed through-passage shape to the centrally extended or centrally depressed open through-passage shape.

12. The connector set of claim 1 wherein the end-face valve has a least one passageway opening capable of opening and closing.

13. The connector set of claim 1 wherein the end-face valves each provide linear passages between the engaged plug and receptacle.

14. The connector set of claim 1 wherein each end-face valves has at least one opening to accommodate at least one contact passage.

15. The connector set of claim 1 wherein each end-face valve provides passage for at least one electrical contact.

16. The connector set of claim 1 wherein each end-face valve provides passage for at least one optical contact.

17. The connector set of claim 1 wherein each end-face valve provides passage for at least one hybrid optical-electrical contacts.

18. A connector set of claim 1 where the end-face valve material volume in the centrally extended or centrally depressed shape with open through-passage passageways is matched to the end-face valve material volume in the flat profile shape with closed through-passage passages.

19. The connector set of claim 18 where the end-face valve open passageway volume in the centrally extended or centrally depressed end-face valve shape is scalable while maintaining constant volume between the centrally extended or centrally depressed shape and the centrally flat closed passageway profile shape.

20. The connector set of claim 1 wherein each end-face valve is capable of being scaled in size to accommodate a range of contact diameters.

21. The connector set of claim 20 where the end-face valve diameter is dependent on the through-passage passage geometry providing scaling ability between the end-face valve diameter and the end-face valve through-passage size.

22. The connector set of claim 20 where the end-face valve centrally extended and centrally depressed geometry is dependent on the through-passage passage geometry providing linear scaling between the end-face valve centrally extended or centrally depressed geometry and the through passage geometry.

23. The connector set of claim 1 where the through-passage geometry is a central passage with two or more mirrored and extended tear drop shaped tails as represented by a hurricane symbol.

24. The connector set of claim 23 where the through-passage orientation forms a radial volute pattern.

25. The connector set of claim 24 where the through-passage orientation imparts a natural twisting of the end-face valve while the valve moves between the centrally extended or centrally depressed through-passage open shape to the centrally flat through passage closed shape.

26. The connector set of claim 1 where the natural twist of the end-face valve moving from the centrally flat closed through-passage shape to the centrally extended or centrally depressed open through-passage shape is mirrored by a cam follower traveling in a radial cam path during engagement of the receptacle and the plug.

27. The connector set of claim 26 wherein the end-face valves are each actuated by mechanical methods.

28. The connector set of claim 26 wherein the cam paths of the plug and of the receptacle work coincidentally during the engagement process to move the plug pin array between a locked attitude to an unlocked attitude where the plug pin array is free to travel between the engaged plug and receptacle and contact the corresponding receptacle pin array.

29. A connector set of claim 26 where the end-seal actuation mechanism is internal to the connector and sealed before during and following engagement from fowling associated with the external environment.

30. The connector set of claim 1 where the end-face valve are integral with the connector shells.

31. The connector set of claim 30 where the integral valves eliminate external actuation mechanisms and reduce part count.

32. The connector set of claim 30 wherein the ring mechanism is a rotational latching mechanism.

33. The connector set of claim 30 wherein the ring mechanism is rotationally actuated by axial motion.

34. The connector set of claim 30 wherein the ring mechanism is rotationally reset following disengagement of the plug and receptacle.

35. The connector set of claim 1 wherein when the receptacle and the plug are engaged, they are fixedly secured together by a ring latching mechanism.

* * * * *